T. S. PATTERSON.
POWER UNIT.
APPLICATION FILED NOV. 25, 1910.

1,052,269.

Patented Feb. 4, 1913.

4 SHEETS—SHEET 1.

T. S. PATTERSON.
POWER UNIT.
APPLICATION FILED NOV. 25, 1910.

1,052,269.

Patented Feb. 4, 1913.

4 SHEETS—SHEET 4.

UNITED STATES PATENT OFFICE.

THOMAS S. PATTERSON, OF ROSEMONT, PENNSYLVANIA, ASSIGNOR TO THE INGLE MACHINE COMPANY, OF ROCHESTER, NEW YORK, A CORPORATION OF NEW YORK.

POWER UNIT.

1,052,269. Specification of Letters Patent. Patented Feb. 4, 1913.

Application filed November 25, 1910. Serial No. 594,137.

*To all whom it may concern:*

Be it known that I, THOMAS S. PATTERSON, a subject of the King of Great Britain and Ireland and the Isle of Man, and a resident of Rosemont, Montgomery county, Pennsylvania, have invented certain Improvements in Power Units, of which the following is a specification.

One object of my invention is to provide a combination of apparatus for generating power which shall primarily possess a high efficiency of operation, require a minimum of attention, and shall in addition be relatively compact as to the arrangement of its parts and conveniently transportable as well as possess perfect regulation of its air and water supply.

Another object of my invention is to provide a combination of apparatus for generating power from steam in which the heat still retained by the steam after it has been used to operate an engine to produce power, may be utilized to raise the temperature of the air supplied to the fuel burned in the steam generator.

A further object of the invention is to provide a novel combination of apparatus including a steam generator, steam engine, and an air cooled condensing device whereby the heat of the exhaust steam from said engine may be efficiently transferred to the air used to support the combustion in the furnace of the steam generator; the various parts being so arranged that the steam used shall at no time come in contact with the lubricating oil.

These objects and other advantageous ends I secure as hereinafter set forth, reference being had to the accompanying drawings, in which:—

Figure 1:
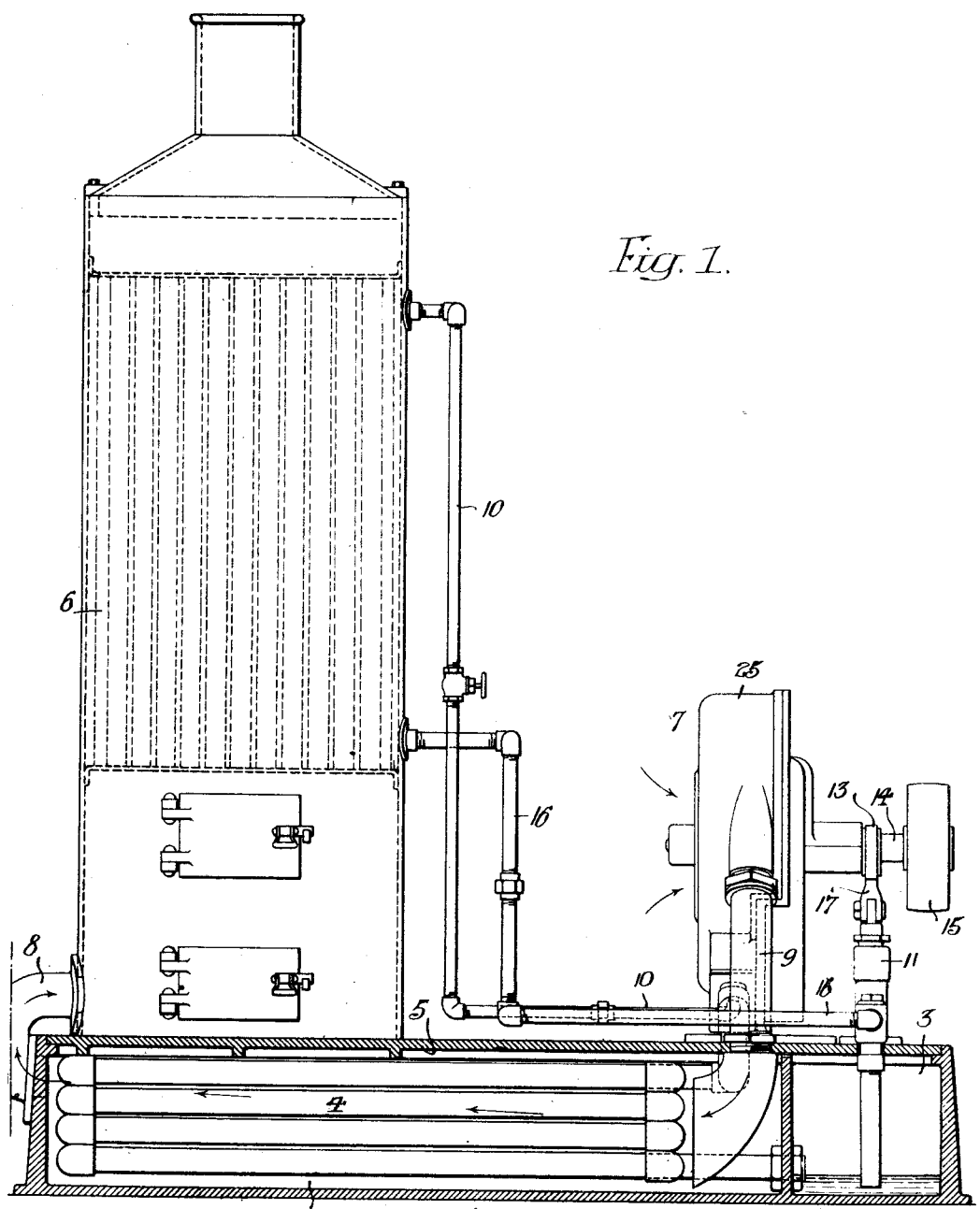
Figure 2:
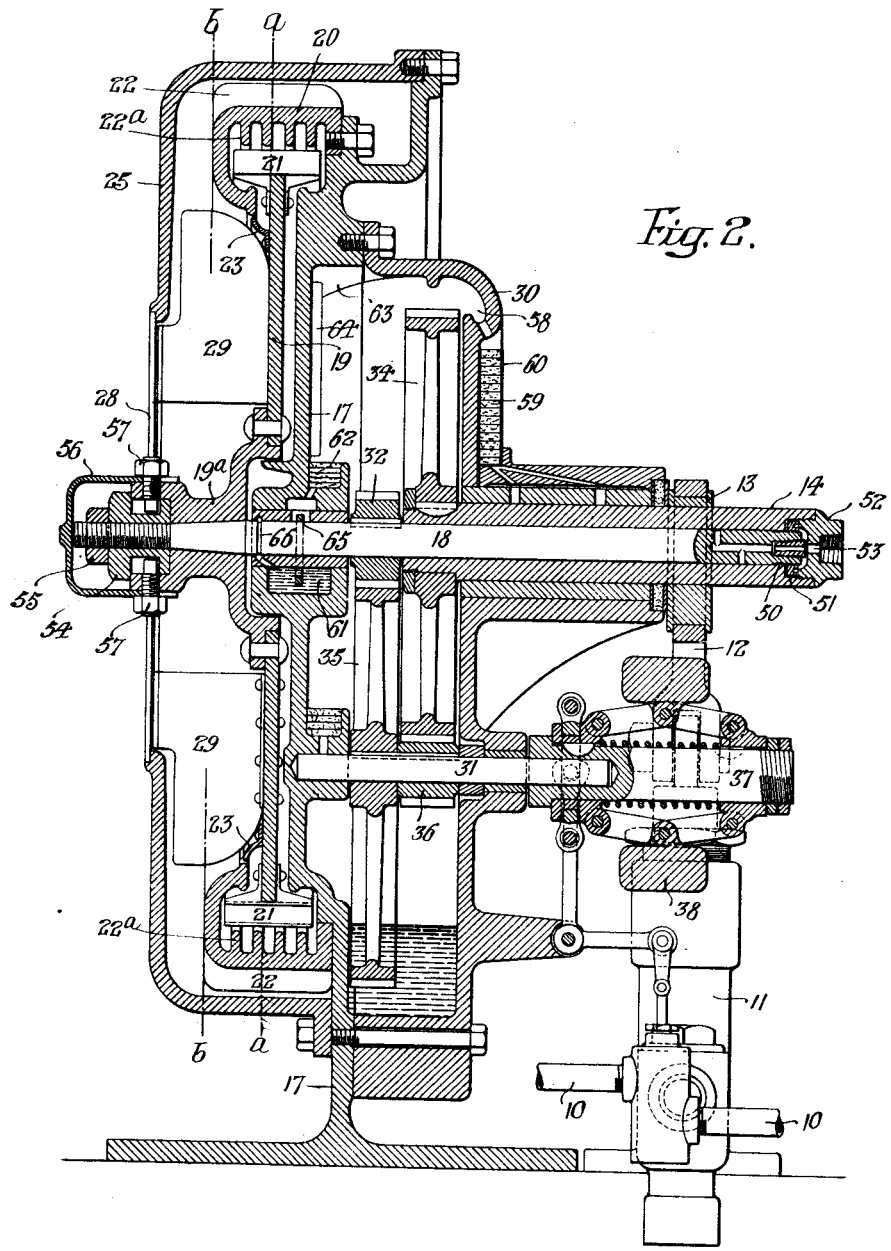
Figure 3:
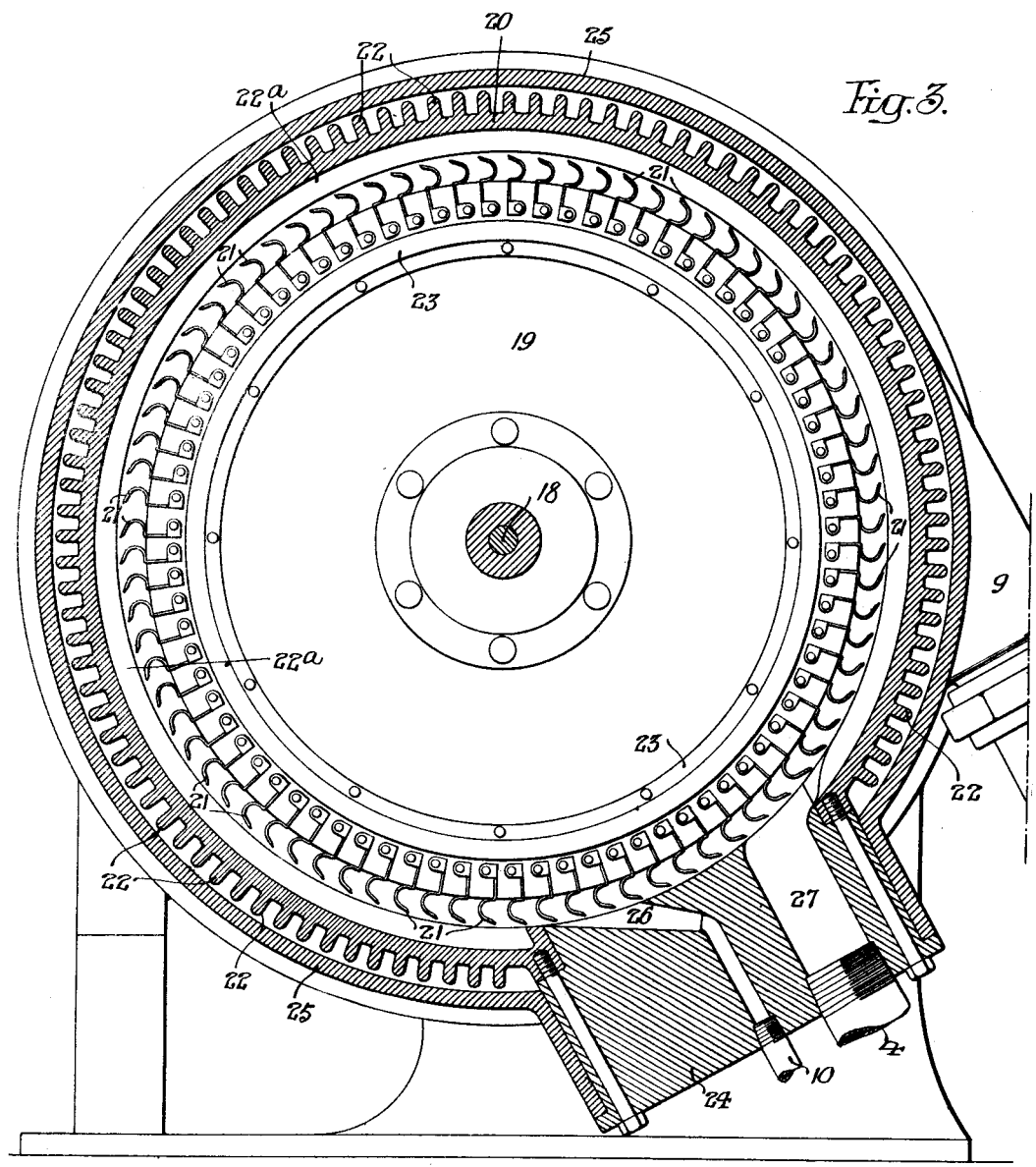
Figure 4:
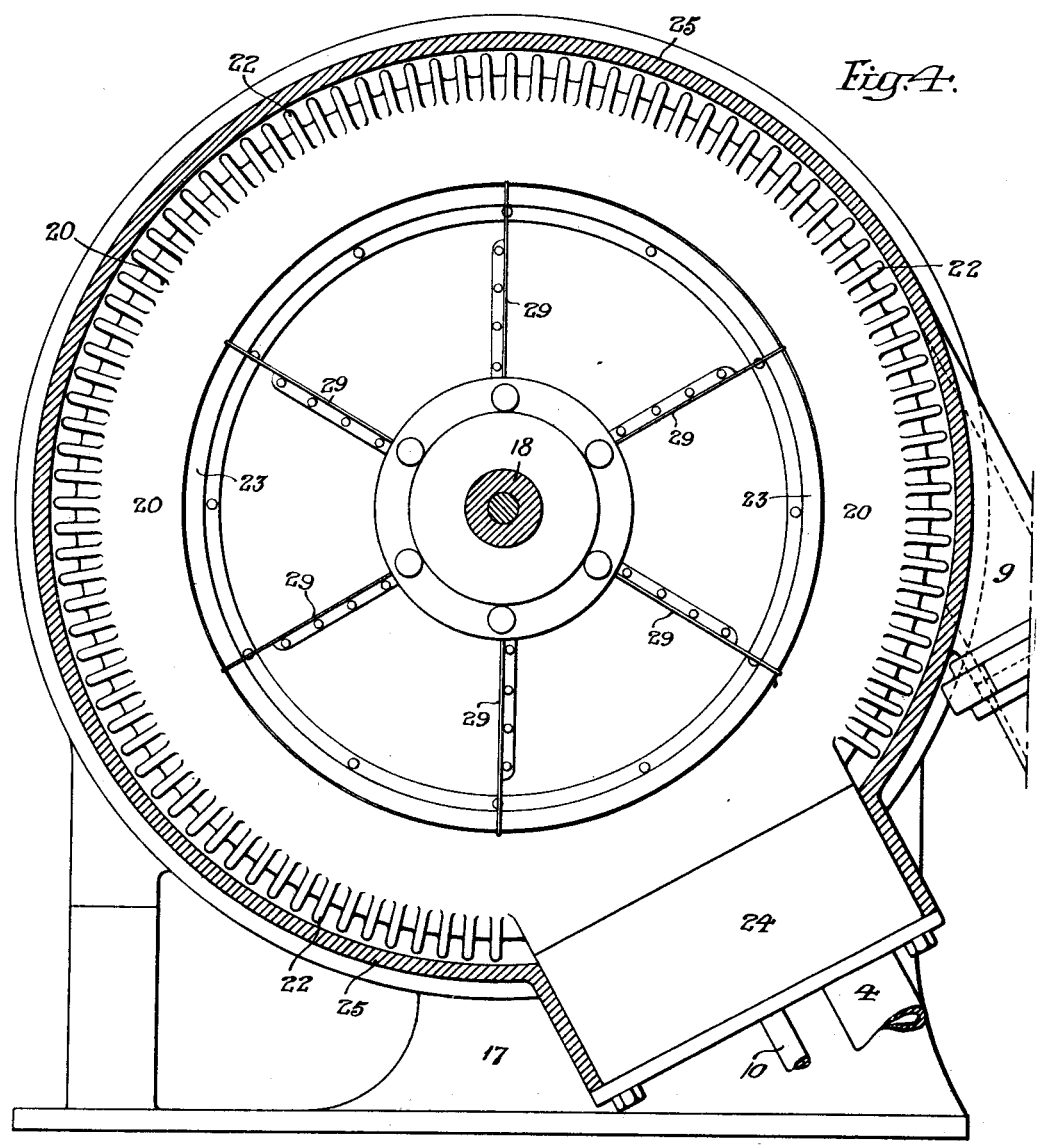

Figure 1, is a side elevation partly in vertical section and to some extent diagrammatic, illustrating apparatus arranged according to my invention; Fig. 2, is a vertical section on a somewhat enlarged scale illustrating the detail construction of the steam engine and blower forming part of my invention, and Figs. 3 and 4 are vertical sections respectively taken on the lines a—a and b—b, Fig. 2.

Referring to Fig. 1 of the above drawings, 1 represents a base structure which in the present instance is in the form of a hollow casing provided with two compartments 2 and 3, of which the first contains a coil or series of pipes 4 connected at one end with the bottom of the compartment 3 which constitutes a hot well for water of condensation. Mounted on the cover 5 of the hollow base structure 1 is a steam boiler or other steam generator 6 and a combined steam engine and blower 7; it being noted that the ash pit or furnace of the boiler is connected through a pipe 8 with the compartment 2 of the base, and that the blower, hereafter described in detail, is connected through a pipe 9 so as to discharge air into said compartment at a point preferably distant from the outlet pipe 8.

The second end of the coil or series of pipes 4 is connected to the steam engine so as to receive the exhaust steam therefrom, while live steam is delivered from the boiler to the engine through a pipe 10. The pump 11 is mounted in or connected to the hot well 3, preferably in such position that its connecting rod 12 may be actuated by an eccentric 13 on a shaft 14 driven by the engine. Any desired device to be driven is connected to the engine through a pulley 15 also mounted on this shaft, and said pump is arranged to force hot water from the well 3 through a pipe 16 to the lower portion of the boiler 6.

From the drawings it will be noted that the engine is of the turbine type, having a supporting structure 17 carried on the cover 5 of the base and provided with a bearing for the rotor shaft 18. At one end this shaft is threaded as indicated at 50 and has mounted on it a nut 51 which, being set in a recess in the end of the sleeve or shaft 14 and inclosed by a cap 52, coöperates with these parts to form a thrust bearing whereby the position of the shaft 18 may be adjusted and its longitudinal movement limited. For holding the nut 51 in any adjusted position, the threaded ends of the shaft 18 is split and is provided with a threaded cavity in which is placed a correspondingly threaded taper plug 53. As is evident, this plug when screwed into the end of the shaft, so distorts this latter as to render movement of the nut 51 practically impossible. The opposite end of the shaft 18 is tapered and threaded as shown in Fig. 2, being provided with a hub 19ᵃ to which the rotor 19 is fixed. Said hub fits the taper portion of the shaft and is counterbored on its outer face for the reception of a nut 54 having a peripheral groove and held in place by a jam nut 55; there being a cap 56 held to the hub by bolts 57 so as to cover the end of the shaft with the nuts. These bolts fit into the peripheral groove of the nut 54 and it is noted that this latter has its outer portion formed of such diameter as to be capable of engaging the end of the hub.

When it is desired to draw the hub off of the shaft, turning of the nut 54 after the removal of the jam nut 55 causes the former to bear against the inner ends of the bolts 57 so that through these, said hub is pulled off of the shaft. On the other hand the hub is forced into place by screwing up the nut 54 so as to cause its outer portion to act on the outer face thereof. The rotor 19 is inclosed in a casing formed partly by a portion of the structure 17 and partly by a casting 20 which is made with interior circular ribs lying in planes parallel to the plane of revolution of the rotor and extending transversely across its outer surface in lines substantially parallel to the line of the shaft 18; the arrangement being such that said part 20 terminates on one side of the rotor just within the circular path described by the buckets thereon so as to leave exposed the greater part of one face of the web of the rotor; there being a projecting ring 23 preferably attached to this web and extending toward the adjacent edge of the part 20 of the casing so as to a great extent prevent air entering the turbine casing as well as to prevent leakage of the steam therefrom.

The circular vanes 22ª are so designed as to absorb to a maximum extent the heat of the steam which may come in contact with them, while the vanes 22 are likewise designed to give off to the surrounding air this heat transmitted to them through the part 20 of the casing.

For the purpose of supplying steam to the turbine and providing for its exhaust therefrom, I employ a nozzle block 24 inserted in a suitable opening of a casing structure 25 also mounted upon the part 17 of the engine structure so as to form therewith a blower casing. This nozzle block in the present instance is bolted to the structure 20 and is provided with a passage 26, to one end of which is connected the steam delivery pipe 10, while its other end is so formed and placed as to deliver steam in the well known manner to the buckets 21 of the turbine. There is also in said block a passage 27 to which is connected the exhaust pipe 4 placed to receive the steam exhausted from the interior of the rotor casing after it has acted on the buckets or blades of the turbine. A suitable opening 28 is provided in the blower casing structure 25 concentric with the shaft 18, for the admission of air thereto, and a suitable number of fan or blower blades 29 are mounted in said casing directly upon the exposed face of the web of the engine rotor 19. A third casting 30 is connected to the engine supporting structure 17 to form therewith a gear casing through which extends the rotor shaft 18 and in which there is also extended an auxiliary shaft 31 parallel to said shaft; there being suitable bearings for this auxiliary shaft formed respectively in the structures 17 and 30. The shaft 18 has keyed to it a pinion 32 and loosely carries the hollow shaft 14 to which is keyed a gear 34, while the shaft 31 has keyed to it a gear 35 and a pinion 36, of which the first meshes with the pinion 32 and the latter meshes with the gear 34.

As before noted a pulley 15 is connected to the sleeve 14 for the delivery of power generated by the engine to any desired device.

As shown in Fig. 2, the auxiliary shaft 31 extends outside of the gear casing where it has attached to it an extension 37 on which is mounted any suitable form of governor 38 designed to regulate the flow of steam to the engine through the pipe 10 so as to cause the rotor of the latter to turn at a predetermined uniform speed.

For the purpose of lubricating the various parts of the engine I place oil in the casing formed by the parts 17 and 30 and under operating conditions this is distributed to all parts of said casing by the various gear wheels. As a result some of the oil finds its way into a hollow 58 at the upper portion of the casting 30 from whence it passes through an opening therein into a container formed by a properly mounted piece of thin sheet metal 59 wherein is placed a body 60 of wool packing. From the bottom of this container a number of oil passages are run to the bearing for the shaft 14 which is mounted in the casting 30.

In the body of the supporting structure 17 is formed an oil well 61 which connects through a suitable opening with a recess holding a body of wool packing indicated at 62, and for the purpose of supplying oil to this latter I provide ribs 63 and 64 designed to lead into it some of the oil thrown off from the gear wheels.

An oil ring 65 resting on the shaft 18 and extending into the oil well 61, keeps this latter supplied with oil and for preventing this latter from escaping along the shaft into the steam containing portion of the engine, I groove said shaft or provide it with a shoulder as indicated at 66, leading the oil therefrom back to the oil well.

Under operating conditions steam from the boiler 6 is delivered through the pipe 10 and nozzle 26 to the buckets 21 of the rotor of the turbine, causing this latter to turn at a speed depending upon the adjustment of the governor. Any desired machine is driven from the pulley 15 to which power is transmitted from the rotor through the shaft 18, pinion 32, gear 35, shaft 31, pinion 36, gear 34, and shaft 14. The revolution of the rotor 19 necessarily draws in air through the opening 28 owing to the provision of the fan blades 29, so that said air is caused to circulate within the casing formed by the parts 25 and 17, around the vanes or ribs 22 of the structure 20. Such air receives heat from said ribs, to which it is transmitted from the steam contacting with the circular ribs 22ª. This partially heated air is then discharged through the pipe 9 into the condenser formed by the chamber 2 of the base 1 and the pipes 4, and is caused to circulate around said pipes, which as shown, are connected to the nozzle block 24 so as to receive the exhaust steam from the engine. Even though this air be partially heated, it serves to so cool the surfaces of the pipes 4 that the exhaust steam in them is condensed and the air itself is still further heated, so that on the one hand hot water is discharged from the lower end of the pipe 4 into the hot well 3 and on the other hand the air heated to a high temperature is discharged from the pipe 8 into the ash pit or furnace of the boiler 6. As will be understood by those skilled in the art, the water in the hot well is at a high temperature and is discharged by the pump 11 (which is operated from the engine shaft 14) directly into the boiler. Since the air for combustion of the fuel in the boiler furnace is highly heated, such combustion is materially facilitated and is caused to take place under the conditions tending to the highest efficiency. It will further be noted that the losses in the steam system are exceedingly low since there is absolutely no heat lost between the engine and the boiler except that escaping by radiation and possible leaks; the heat of the exhaust steam being utilized when condensing the same, for the purpose of heating the air delivered to the boiler furnace. It will be noted further that the apparatus as a whole is exceedingly compact and substantial in construction and lends itself with the greatest ease to the construction of a conveniently operative and easily transportable power unit. By the peculiar engine-blower construction employed, the efficiency of the combination is still further raised, since any heat radiated from the engine is utilized in raising the temperature of the air operated on by the fan, which owing to its direct connection to the rotor of the engine, occupies a minimum of space and permits of the greatest economy from a manufacturing as well as from the operating standpoint. There is practically no water lost from the apparatus above described, and owing to the peculiar construction and arrangement of the bearings there is no contamination of the steam by the oil used for lubricating.

I claim:—

1. The combination in a steam engine of a main supporting structure; a shaft journaled therein; three structures coöperating with said supporting structure to form three chambers; a rotary engine member mounted on the shaft and extending partially into one of the said chambers while having an exposed portion in the second of the chambers; a series of fan blades mounted on said exposed portion in said second chamber; with reducing gearing connected to the shaft and mounted in the third chamber.

2. The combination of a casing having internal and external sets of heat transmitting projections; a rotary member in the casing; means for supplying steam to drive said member; and means actuated from this rotary member for forcing air through the external set of heat transmitting projections.

3. The combination of a casing; a steam engine therein having heat transmitting projections on its exterior and interior surfaces; and a blower also in the casing operatively connected to the steam engine; there being an inlet and an outlet to the casing placed to cause air to circulate over the exterior projections of the steam engine.

4. The combination of two casings one within the other; a rotary member coöperating with the inner casing to form a steam engine; two sets of heat transmitting projections respectively mounted on the interior and exterior surfaces of said inner casing; and a blower actuated from said rotary member and mounted in the outer casing; there being an inlet and outlet to said latter casing in position to cause air to be circulated by the blower over the external projections of the inner casing so as to be heated thereby.

5. The combination of two casings, one within the other; the inner casing having interior and exterior projections for the absorption and radiation of heat; a rotary member in the inner casing forming the rotor of a steam engine; and plates in the outer casing connected to said rotor so as to circulate air over the exterior projections of the inner casing.

6. The combination of two casings one within the other; a rotary member extending into the inner casing and having buckets therein; there being a series of ribs within the inner casing extending in planes substantially parallel to the plane of revolution of said rotary member; and blower-plates connected to the rotary member; said outer casing having an inlet and an outlet placed to cause the blower plates to circulate air over the inner casing.

7. The combination of two casings one within the other; a rotary member extending into the inner casing and having buckets; means for delivering steam to and exhausting it from the inner casing; blower blades in the outer casing connected to said rotary member; there being ribs in the inner casing extending substantially parallel to the plane of revolution of the rotary member; and transverse ribs on the outer surface of the inner casing; having an inlet and an outlet for said outer casing.

8. The combination of two casings one within the other; a shaft; a rotary member mounted on the shaft and extending through the outer casing into the inner casing; buckets on said member within the inner casing; blower plates mounted on said rotary member in the outer casing; means for delivering steam to and exhausting it from the inner casing; projections in the inner casing for absorbing heat from the steam therein; and other projections on the outside of the inner casing for radiating heat; there being an inlet and an outlet for said outer casing.

In testimony whereof I have signed my name to this specification, in the presence of two subscribing witnesses.

THOMAS S. PATTERSON.

Witnesses:
 WILLIAM E. BRADLEY,
 WM. A. BARR.

---

Copies of this patent may be obtained for five cents each, by addressing the "Commissioner of Patents, Washington, D. C."